United States Patent [19]

Kerlin

[11] Patent Number: 4,684,944
[45] Date of Patent: Aug. 4, 1987

[54] REMOTE CONTROL SYSTEM FOR ROTARY DEVICE

[75] Inventor: Jack H. Kerlin, Ann Arbor, Mich.

[73] Assignee: Balance Dynamics Co., Ann Arbor, Mich.

[21] Appl. No.: 592,147

[22] Filed: Mar. 22, 1984

[51] Int. Cl.⁴ .............................................. H04Q 1/00
[52] U.S. Cl. .................................. 340/825.06; 73/66; 74/573 F; 318/345 E; 340/310 R
[58] Field of Search ............. 74/573 R, 573 F; 73/66, 73/462; 318/602, 345 E, 310-312, 254, 439; 51/1, 2 AA, 104; 340/825.06, 310 R

[56] References Cited

U.S. PATENT DOCUMENTS

| | | | |
|---|---|---|---|
| 3,095,676 | 7/1963 | Voller | 74/573 X |
| 3,149,502 | 9/1964 | Caruso et al. | 74/573 |
| 3,959,705 | 5/1976 | Salihi | 318/439 |
| 4,007,458 | 2/1977 | Hollabaugh | 340/310 R |
| 4,090,116 | 5/1978 | Lippitt | 318/345 E |
| 4,131,882 | 12/1978 | Hollabaugh et al. | 340/825.06 X |
| 4,156,866 | 5/1979 | Miller | 340/825.06 X |

*Primary Examiner*—Ulysses Weldon
*Attorney, Agent, or Firm*—Harness, Dickey & Pierce

[57] ABSTRACT

A control system for the remote control of functions on a rotating object from a stationary location is disclosed. The control system, in the disclosed embodiment, constitutes a single channel, four function-select, power transmission system with an encoder at the stationary location and a decoder on the rotating object. The encoder is used to develop selected electrical waveform patterns each of which is uniquely correlated with a particular control function to be performed on the rotating object. Each waveform pattern consists of a unique pattern of electrical waveform half cycles. The particular electrical waveform pattern for the particular control function to be performed is transmitted to the rotating object via center contact assemblies which engage opposite ends of a spindle on which the rotating object is supported for rotation. The decoder circuit detects the particular electrical waveform pattern which is received on the rotating object and causes the electrical power of that waveform pattern to be used to perform the particular control function. The disclosed application of the invention is in an unbalance compensator.

10 Claims, 5 Drawing Figures

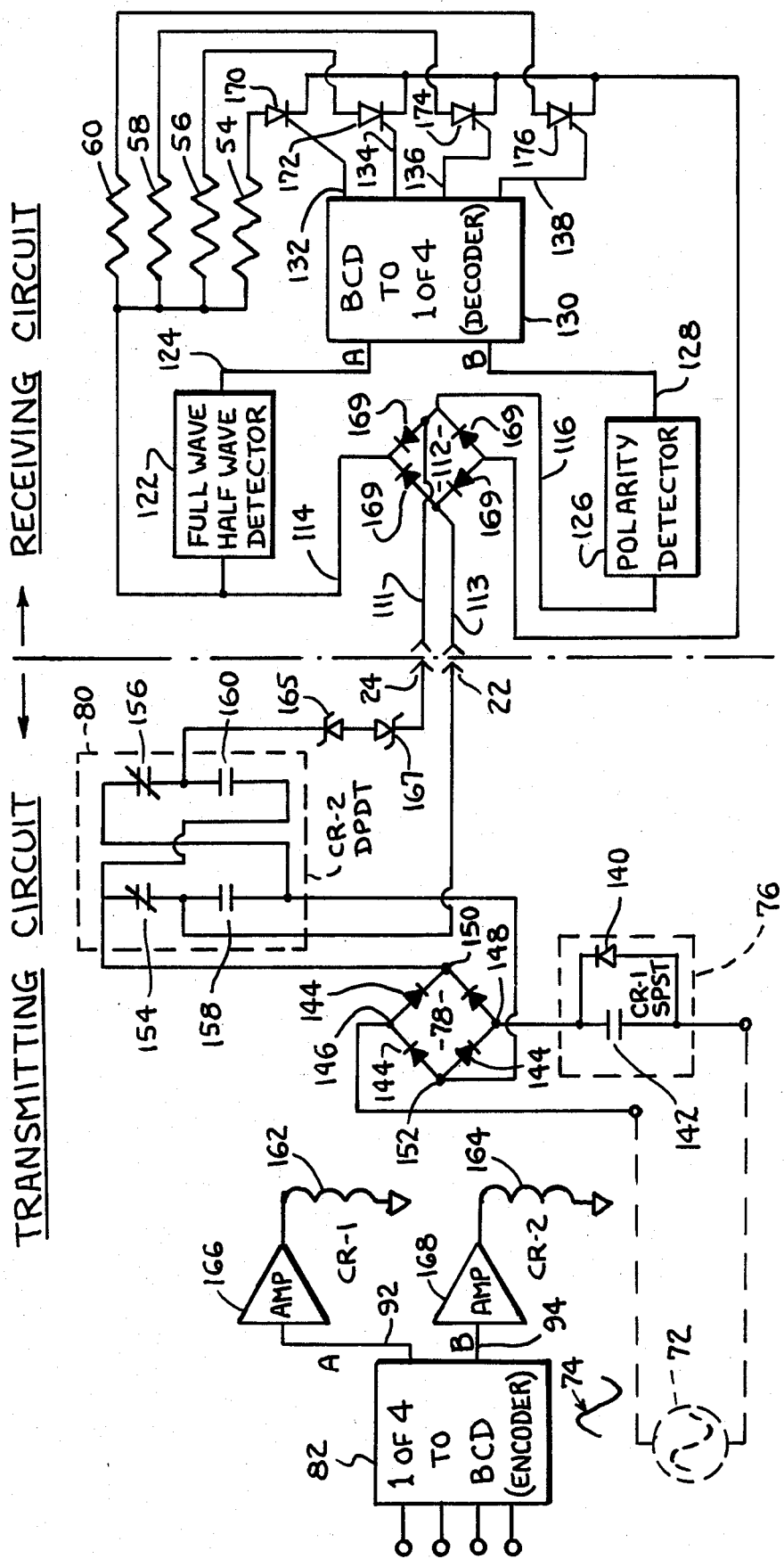

REMOTE CONTROL SYSTEM FOR ROTARY DEVICE

BACKGROUND AND SUMMARY OF THE INVENTION

The present invention relates to a control system for performing remote control functions on a rotating object from a stationary location or object. In the application of the preferred embodiment of the invention as disclosed in this patent application, the control system comprises a single channel, four function-select, power transmission system with an encoder at the stationary location and a decoder on the rotating object.

Many types of rotating devices such as rotary clamps, indexing chucks, or spindle mounted balancers, sometimes require independent control of several mechanisms on the rotating portion of the device. Where control is performed electrically, slip rings are usually employed to conduct control signals between stationary and rotary elements. One ring is used per control function plus a ring for the common line. Thus if four different functions are to be controlled on a rotating object, a total of five slip rings would be used.

Under operating conditions of high speed, high current, and a contaminating environment, slip rings have shown limited service life. One way to improve reliability of slip rings is to reduce ring diameter, which results in lower surface speed between brush and ring. This concept can be carried further by reducing the diameter of rubbing surfaces to a mere center point wherein the ring and brush as such are eliminated. A conical cup replaces the ring and a conical point riding in the cup acts as the brush. Of course only one point/cup assembly hereinafter sometimes referred to as "center contact" can be used on one end of the shaft in order to complete a circuit. A second center contact must be used on the opposite end of the shaft.

While the center contact design solves problems attendant to slip rings, it provides only a single channel. In order to control more than one function on a rotating body, a signal transmitted through this signal channel must be modified in some way to represent a code containing function-select information. So called single channel data transmissions, as found in communication and computer art, utilize multiplexing techniques to transmit numerous messages simultaneously. Other approaches include amplitude or frequency modulation, or variable phase shifting of two superimposed signals.

Applicant has invented new control systems as illustrated in his prior allowed U.S. patent applications, Ser. Nos. 342,450 and 358,999.

Where significant power must also be delivered over a single channel along with signal information, the size and cost of the required hardware to develop an appropriate system for delivering both power and function-select information can be expensive.

In one respect the present invention is directed to a new and improved control system for the remote control of multiple functions on a rotating object which affords a significant cost saving over such more expensive systems.

The present invention permits transmission of relatively high electrical power levels over two wires via a waveform encoded to select particular functions to be performed. Thus a center contact at each end of a spindle, or shaft, supporting a rotating object enables both power transmission and function-select control capabilities to be provided for a rotating body without the use of slip rings.

In the preferred embodiment disclosed herein, the encoded waveform makes it possible to select up to four control functions.

The present invention arises in part through the recognition that a sinusoidal waveform is readily susceptible to two basic transformations. One, a full wave to half wave transformation by means of a diode, and two, a polarity reversal using a double-pole, double-throw relay, by way of example. Four combinations are then available: (1) a positive full wave (+FW); (2) a negative full wave (−FW); (3) a positive half wave (+HW); (4) a negative half wave (−HW).

One of these four combinations is transmitted via the center contacts to the rotating object and the rotating object contains a receiving circuit which decodes the signal and which causes power from the signal to be applied to the appropriate function which is to be controlled.

The control system comprises transmitting circuitry on the stationary portion and the coupling means between the transmitting circuit and the receiving circuit. The coupling means includes the center contacts at opposite ends of the spindle on which the rotating object is supported for rotation. Thus, in addition to avoiding the use of slip rings, the invention simplifies upon the circuitry for both transmitting circuit and receiving circuit whereby a more economical construction results.

Because the power waveform which is transmitted from the stationary object to the rotating object is itself inherently representative of the particular coding information, there are essentially no signal-to-noise problems which need to be addressed in use of the present invention. This is in contrast to other controls where a coded signal is superimposed on a power waveform.

While the present invention has application to a variety of different types of rotating devices, such as those mentioned above, the present invention is disclosed herein as applied to a spindle mounted balancer employing principles of applicant's prior allowed patent applications as referred to above.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 4 is a truth table useful in explaining the operation of the control system.

FIG. 5 is a more detailed schematic diagram of the block diagram of FIG. 3.

DESCRIPTION OF THE PREFERRED EMBODIMENT

Figure 1:
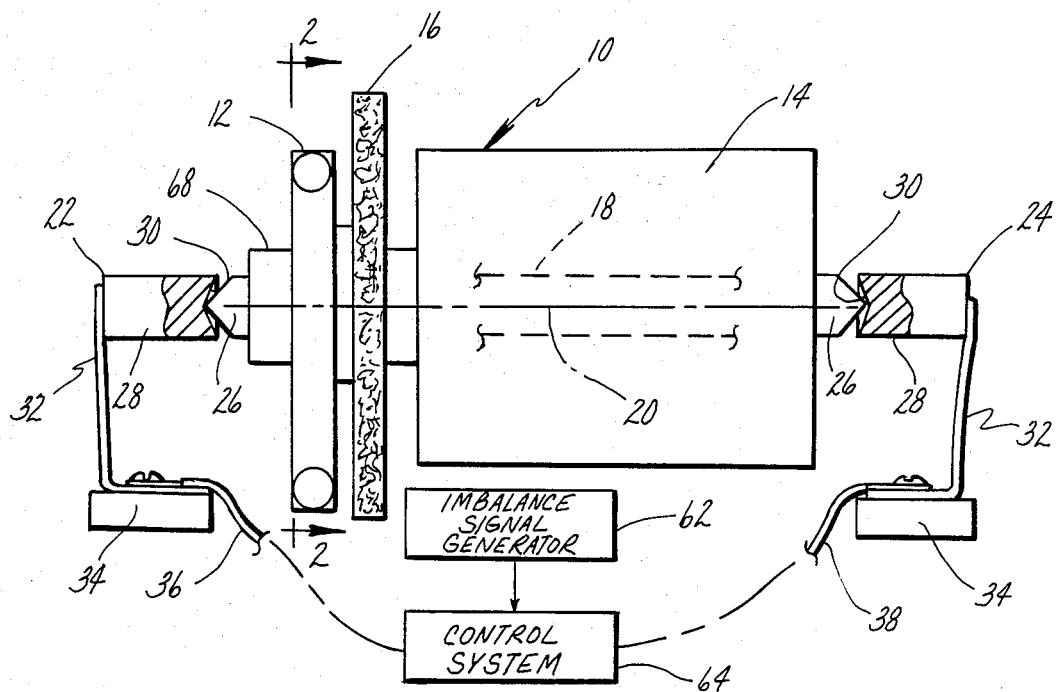
FIG. 1 is a side elevational view, semi-schematic in nature, illustrating a rotary device containing a control system embodying principles of the present invention.
Figure 2:
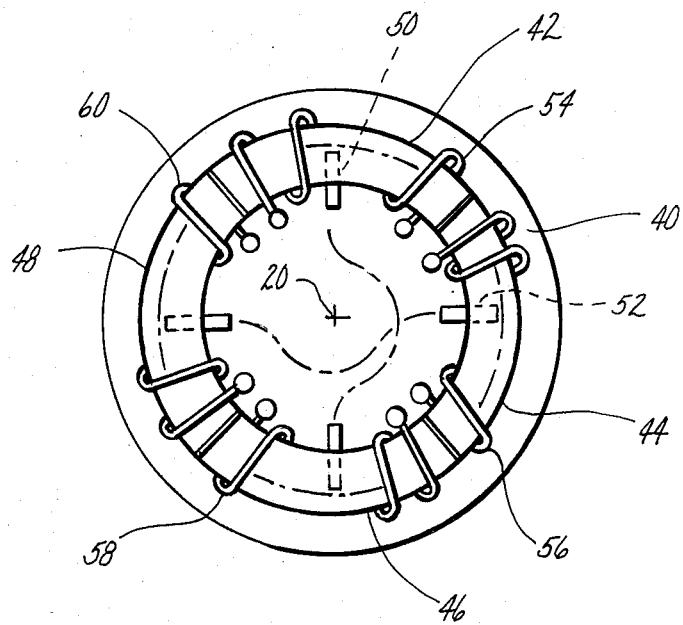
FIG. 2 is an enlarged cross sectional view taken substantially in the direction of arrows 2—2 in FIG. 1.

For purposes of illustrating principles of the invention in one exemplary application, FIGS. 1 and 2 depict a machine 10 to which the present invention has been applied. Machine 10 is a grinding machine with which an unbalance compensator 12 is cooperatively associated. Unbalance compensator 12 is a device, which in conjunction with the control system of the present invention, provides for correction of rotational imbalance of grinding machine 10.

The grinding machine comprises a frame 14 containing a grinding wheel 16 journaled for rotation. Grinding wheel 16 mounts on spindle, or shaft, structure 18 of the grinding machine, and both grinding wheel and spindle are operable about an axis of rotation 20.

Unbalance compensator 12 mounts on spindle 18 whereby it also rotates in unison with the grinding wheel and spindle when the grinding machine is operated.

Assemblies forming center contacts 22 and 24 are disposed at opposite ends of spindle 18. The two center contact assemblies 22 and 24 are of substantially identical construction. The ends of spindle 18 are conically pointed concentric with axis 20. The conical points are identified by the reference numerals 26.

Each center contact assembly 22, 24 comprises an electrically conductive contact 28 of cylindrical form which has a conically tapered seat 30 in one axial end. Each contact 28 and its seat 30 are coaxial with axis 20. An electrically conductive cantilever spring 32 supports each contact 28 from an insulator block 34. With this arrangement each contact 28 is axially biased against the corresponding pointed end of spindle 18 such that each spindle point tip 26 seats at the bottom of the corresponding seat 30. The forceful engagement is obtained by the resilient spring force of each cantilever. The conical angle of each seat is greater than that of the pointed spindle tip so that essentially point contact occurs between each contact 28 and spindle 18.

The arrangement functions in the following manner. As spindle 18 rotates, each contact is urged against the end of the shaft thereby providing electrical continuity for current flow between each center contact and spindle end. Lead wires 36 and 38 provide for the respective connection of the center contact structures in electric association with the control system.

FIG. 2 illustrates further detail of unbalance compensator 12. The unbalance compensator comprises a main circular body 40 via which the unbalance compensator mounts on spindle 18. Contained on body 40 are four uniformly arranged unbalance chambers 42, 44, 46 and 48. Opposite balance chambers are communicated by transfer tubes; transfer tube 50 for chambers 42 and 46 and transfer tube 52 for chambers 44 and 48. Thus the arrangement defines two separate sealed systems, orthogonally related, one system being the chambers 42 and 46 and the transfer tube 50, and the other being the chambers 44, 48 and the transfer tube 52. Each sealed system contains balance mass fluid.

Associated with each chamber is a heater element. The heater elements are identified as 54 for chamber 42, as 56 for chamber 44, as 58 for chamber 46, and as 60 for chamber 48. Each heater element is a heating coil wrapped around the corresponding chamber so that when energized, current flows through the heating coil and heat is transferred to the balance mass fluid within the corresponding cham- ber.

By selective energization of the heater elements, a temperature differential between opposite chambers is created with the balance mass fluid vaporizing and the vapor transferring via the transfer tube from a hotter chamber to the opposite cooler chamber where it condenses. By controlled selective energizing of the heater elements, the balance mass may be re-distributed in such a manner as to provide balance for the entire rotating mass so as to correct for any detected imbalance.

Further details of the unbalance compensator may be found in the above identified patent applications if the reader so desires. Such further details however are unnecessary for explanation of principles of the present invention, it being understood that the present invention may be applied to other applications as well as an unbalance compensator of the type just described.

In the exemplary application of the present invention in assocation with an unbalance compensator, an imbalance signal generator circuit 62 is illustrated in FIG. 1 in association with grinding machine 10. Circuit 62 monitors imbalance and provides signals correlated with particular circumferential locations of imbalance. Further detail of how such signals can be developed are illustrated in the above identified allowed patent applications and a further detailed description will not be repeated here. Suffice it to say that the signals provided by circuit 62 are indicative of particular locations of imbalance and are supplied to the control system. The control system acts upon the signals to effect redistribution of the balance mass on the unbalance compensator so as to correct for the detected imbalance. For the illustrated application of the present invention, the unbalance compensator is divided into four 90° quandrants corresponding to the four uniformly arranged chambers 42, 44, 46, and 48. Circuit 62 detects the particular quadrant in which imbalance exists, and the control system responds to correct the imbalance by energizing the appropriate coil.

Figure 3:
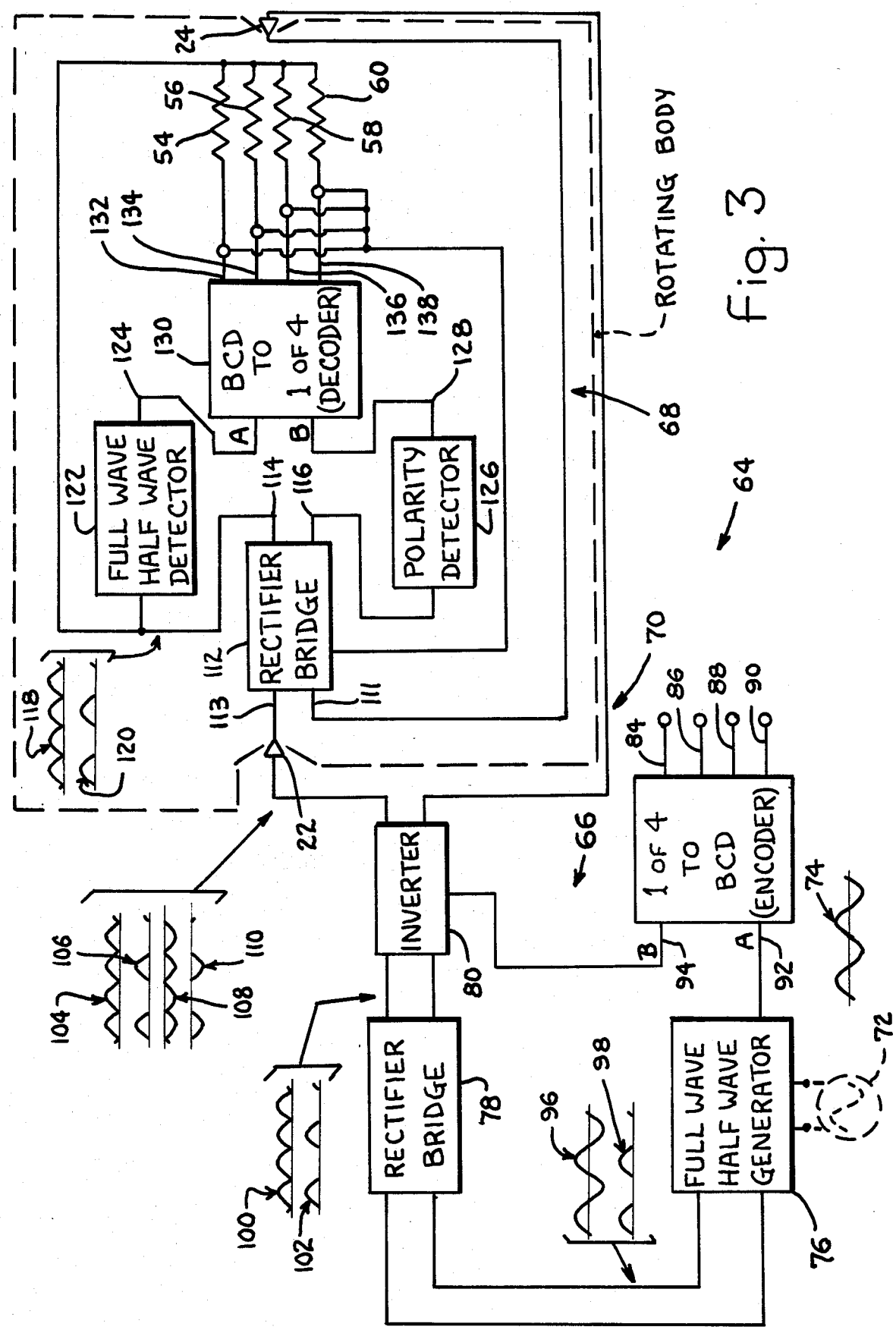
FIG. 3 is a schematic block diagram, including waveforms, illustrating further detail of the control system.

FIG. 3 illustrates in block diagram form a presently preferred embodiment of control system 64 embodying principles of the present invention.

Control system 64 comprises a transmitting circuit portion 66 and a receiving circuit portion 68, the latter portion being on the rotating device, specifically on unbalance compensator 12. Transmitting portion 66 and receiving portion 68 are operatively connected by a coupling circuit portion 70 which includes the two center contact assemblies 22 and 24.

Transmitting portion 66 and the part of coupling portion 70 up to and including center contact assemblies 22 and 24 are stationarily mounted. The signals from circuit 62 are supplied as inputs to transmitting portion 66.

Also supplied to transmitting portion 66 is a full wave sinusoidal AC waveform from a full wave sinusoidal AC generator 72. These inputs to transmitting portion 66 control the waveform which is delivered via coupling portion 70 to receiving portion 68.

Consideration of further details of transmitting circuit portion 66 is now appropriate. The full wave sinusoidal waveform which is supplied from generator 72 to transmitting circuit portion 66 is designated by the reference numeral 74. Waveform 74 is supplied to an input of a full wave/half wave generator circuit 76. A rectifier bridge circuit 78 and an inverter circuit 80 are coactively associated with full wave/half wave generator circuit 76. As one can perceive from overall consideration of FIG. 3, the individual circuits of transmitting circuit portion 66 are operable to develop certain other waveform patterns.

Full wave/half wave generator circuit 76 and inverter circuit 80 are cooperatively associated with an encoder circuit 82 which also forms a part of transmitting circuit portion 66. Encoder circuit 82 is a one-of-four to BCD circuit having four signal inputs 84, 86, 88 and 90 and two signal outputs 92, 94. For convenience, the outputs 92, 94 are also identified by the designations A and B respectively, the A and B designations referring to the respective signals at these two outputs.

Inputs 84, 86, 88 and 90 are operatively connected with circuit 62. The nature of the signals from circuit 62 is such that only one of the inputs 84, 86, 88 and 90 is activated at any given time. The particular input 84, 86, 88 and 90 which is activated corresponds to a particular location of imbalance on the rotating mass. In other words each input 84, 86, 88 and 90 is correlated with a particular 90° quadrant.

Encoder circuit 82 is operable to detect the particular input activated by the imbalance signal and to develop a corresponding two-bit binary signal, whose bits are provided at outputs 92 and 94. It will be recognized that there are four possible output states for encoder circuit 82 depending upon which one of the four inputs is being activated by the imbalance signal.

One of the binary output bits (output 92) is supplied to full wave/half wave generator circuit 76 while the other (output 94) is supplied to inverter circuit 80.

For purposes of explanation each bit will be considered as having a low state and a high state. In one state of signal A, full wave/half wave generator circuit 76 is effective to permit transmission of the full wave AC waveform 74 to rectifier bridge 78. This waveform is identified by the reference numeral 96. When output signal A is in the opposite state, full wave/half wave generator circuit 76 blocks one particular polarity half cycle of the full wave AC waveform, the negative half cycle in the example illustrated, and hence, in this state a positive half cycle waveform pattern 98 is transmitted to rectifier bridge 78.

Rectifier bridge 78 is operable upon each of the respective waveforms 96, 98 in the following respective manners.

When waveform 96 is being supplied to rectifier bridge 78, the output waveform from the rectifier bridge appears as a full wave rectified waveform 100.

When waveform 98 is being supplied to rectifier bridge 78, it is essentially fully transmitted directly through the rectifier bridge to appear as waveform 102 at the bridge output. Thus, depending upon the condition of signal A, either waveform 100 or waveform 102 is supplied to inverter circuit 80.

Inverter circuit 80 is operable to provide either an inverting or a non-inverting function. Whether the inverter circuit functions in the inverting or the non-inverting mode is determined by the condition of signal B. When signal B is in one of its two conditions, circuit 80 operates as an inverter while when signal B is in the other condition, the inverter circuit does not invert.

In other words, when the inverter circuit is in its non-inverting mode each waveform 100, 102 is transmitted through essentially unaltered so as to appear as respective waveforms 104, 106. When the inverter circuit 80 is in the inverting mode, waveform 100 will be inverted so as to appear as a waveform 108 and waveform 102 will be inverted so as to appear as a waveform 110.

Thus there are four possible waveforms which can be developed at the output of inverter circuit 80 which forms the output of transmitting circuit portion 66. These are the waveforms 104, 106, 108 and 110 which are respectively: a positive full wave (+FW), a positive half wave (+HW), a negative full wave (−FW) and a negative half wave (−HW).

The truth table of FIG. 4 correlates these waveforms and the particular conditions of signals A and B.

Accordingly, a particular one of the waveforms 104, 106, 108, 110 is transmitted from transmitting circuit portion 66 via coupling circuit 70 to receiving circuit portion 68 on the rotating body in accordance with the particular indication of imbalance.

Receiving circuit portion 68 constitutes an electrical load across the opposite ends of spindle 18. For convenience, let it be assumed that center contact assembly 24 constitutes ground and that the other center contact assembly 22 constitutes the waveform input.

Receiving circuit portion 68 comprises a rectifier bridge 112 forming the input to the receiving circuit. One of the input terminals 111 of the rectifier bridge is connected at spindle ground. The other 113 is at the waveform input. Thus, for either of the two full wave waveforms 104, 108, rectifier bridge 112 will develop across its outputs 114, 116 a full wave rectified waveform 118 having a positive polarity at output 114 relative to output 116. Likewise for either of the two half wave waveforms 106, 110, rectifier bridge 112 will develop a positive half wave waveform 120.

A full wave/half wave detector circuit 122 is operatively associated with the rectifier bridge output to detect which of the two particular waveforms 118, 120 is appearing at the rectifier bridge output. Detector circuit 122 provides a binary signal at its output 124 whose state is indicative of the particular waveform 118, 120. In other words, when a full wave waveform 118 is being detected, the signal at output 124 is in one logic state, while when a half wave waveform is being detected, it is in the opposite logic state.

A polarity detector circuit 126 is also cooperatively associated with rectifier bridge 112. The polarity detector circuit is operable to detect the particular polarity of the input waveform to the rectifier bridge. Circuit 126 provides a binary logic signal at its output 128 whose state is indicative of the polarity of the waveform being supplied to rectifier bridge 112. When a negative polarity is being received by rectifier bridge 112, the binary signal output of polarity detector 126 is in one state and when the opposite polarity is being detected, it is in the opposite state.

Receiving circuit portion 68 further includes a BCD to one-of-four decoder circuit 130. Circuit 130 has two binary inputs each of which is respectively connected to a respective one of the outputs 124, 128 of the circuits 122, 126 respectively. Decoder circuit 130 has four outputs 132, 134, 136, 138.

The two bit input to decoder circuit 130 provides four particular input conditions. A particular one of the outputs 132, 134, 136, 138 is activated for each particular one of the four input conditions.

Hence, receiving circuit portion 68 is effective to activate a particular one of the outputs 132, 134, 136, 138 in correlation with a particular one of the waveform patterns 104, 106, 108, 110 which the receiving circuit receives.

In this way, the control system is effective to perform a particular one of four control functions on the rotating object in accordance with the particular one of the four inputs to encoder circuit 82 which has been activated.

A corresponding load is associated with each of the outputs 132, 134, 136, 138, and is activated when the corresponding output is activated. Either a full wave rectified or a half wave rectified positive waveform is applied across the activated load relative to the spindle ground. These loads are identified by the same reference numerals as the heater coils of the unbalance compensator since the coils are the loads which are selectively energized in accordance with the operation of the unbalance compensator in the disclosed application of the invention.

The nature of the illustrated embodiment is such that the logic signals which appear at outputs 124, 128 correspond to the logic signals A and B at outputs 92, 94 and therefore the Truth Table of FIG. 4 also provides a correlation between the logic signal level and the particular heater coil which is being energized by each particular condition of the A and B signals.

FIG. 5 illustrates greater detail of the electrical schematic circuitry constituting the preferred embodiment of the invention in accordance with the block diagram of FIG. 3.

The specific circuit implementation of full wave/half wave generator circuit 76 comprises that circuit being connected in series in one of the input branches to rectifier bridge 78 from AC generator 72. The full wave/-half wave generator circuit comprises a diode 140 poled as shown in parallel with a relay contact 142.

Rectifier bridge 78 comprises four diodes 144 arranged in a conventional full wave rectifying pattern. The input to the bridge is across terminals 146, 148 while the output from the bridge is across terminals 150, 152.

Inverter circuit 80 comprises a set of four relay contacts 154, 156, 158 and 160. Contacts 154, 156 are normally closed while the contacts 158, 160 are normally open.

Contacts 142 are under the control of a coil 162 of a relay CR 1. Contacts 154, 156, 158 and 160 are under the control of a coil 164 of a relay CR 2. The two relays are in turn respectively under the control of encoder circuit 82, relay CR 1 being controlled by the condition of the A signal at output 92 and relay CR 2 being under the control of the B signal at output 94. Preferably the logic signal outputs operate through amplifiers 166, 168 respectively to drive the respective relay coils 162, 164.

From consideration of this much of FIG. 5 it can be appreciated that when relay CR 1 contacts 142 are closed, diode 140 is shorted out and the full wave signal 74 is supplied across input terminals 146, 148. Accordingly, output waveform 100 is developed across output terminals 150, 152. When relay contacts 142 are open, diode 140 is in circuit to effectively short out the negative polarity half wave portions of waveform 74 so that it is waveform 98 which appears across terminals 146, 148.

When coil 164 is not energized, normally closed contacts 154, 156 are closed and normally open contacts 158, 160 are open so that terminal 150 is connected through contacts 154 to the center contact assembly 22 while the terminal 152 is connected through contacts 156 to center contact assembly 24.

When coil 162 is activated to cause contacts 154, 156 to open and contacts 158, 160 to close, inversion takes place because terminal 150 is now connected to ground and terminal 152 to the waveform input 113.

It will also be observed that a pair of back-to-back connected power zener diodes 165 and 167 are connected in the coupling circuit so as to be in series with the input to rectifier bridge 112. As will be seen based upon the further detailed description of the receiving circuit, these power zener diodes are useful in ensuring proper switching from one heating coil to another.

Receiving circuit rectifier bridge 112 comprises a series of four diodes 169 connected in the illustrated conventional manner. The input terminals of the rectifier bridge are terminals 111 and 113. The output terminals of the rectifier bridge are terminals 114 and 116.

Full wave/half wave detector circuit 122 may be of any suitable construction to distinguish between full and half wave waveforms at terminal 114. For example it may develop a time average voltage which is compared to a reference such that when a half wave is detected, the time average voltage is below the reference and when a full wave is detected, it is above the reference. The time average voltage in relation to the reference in turn determines the state of the binary output signal appearing at line 124.

Polarity detector circuit 126 likewise may be operable relative to a reference to determine the logic level of the signal at output 128. In this regard the polarity detector monitors the voltage across one of the diodes in the bridge which would be indicative of a negative polarity input signal to the rectifier bridge and when such negative polarity is detected, one condition of the binary signal output at line 128 ensues. When there is a positive polarity input to the bridge, there is no voltage developed across this diode and hence the polarity detector now operates to cause its logic signal at output 128 to revert to the opposite logic condition.

In order to operate the unbalance compensator for imbalance correction, each heating coil is cooperatively associated with a controlled conduction electronic switch. In the example, these controlled conduction switches are SCR's which are identified by the reference numerals 170, 172, 174 and 176.

Each SCR has its principal conduction path (i.e. anode-cathode path) connected in series with an associated heating coil. The heating coil and principal conduction path of each SCR forms a potential load across the output terminals of rectifier bridge 112, with the four coil and SCR pairs being four parallel branches across the output of the rectifier bridge.

The gate of each SCR is connected to a corresponding output of decoder circuit 130. Hence, it can be appreciated that whichever particular output of the decoder is activated will cause the corresponding SCR to be switched into conduction and hence cause the corresponding heating coil to be energized. When the decoder circuit switches activation from one output to another, the gating signal at the gate of the previously energized SCR is removed. In order to insure the proper turn off of that SCR it can be perceived that the zener power diodes 165, 167 in the coupling circuit have a cooperative effect to produce a small reverse voltage which tends to ensure that the SCR turns off. In this way, each particular heating coil is properly activated in accordance with the sensed imbalance and a corresponding imbalance correction ensues.

From the foregoing description it can be appreciated that the control system of the invention constitutes a single channel, four function-select, power transmission system with an encoder at a stationary location and a decoder on the rotating object. Because the electronic circuit devices on the rotating object require reference voltage(s) for operation, the circuitry on the rotating object includes a conventional power supply circuit chip (not shown) which utilizes a minute percentage of the electrical input to the rotating object to develop appropriate reference voltage(s) for the various electronic circuit devices. However substantially all of the electrical power input to the rotating object is used to activate the heater coils.

In regard to this latter point it can be appreciated that the average power input to a heating coil will be approximately twice as large in the case of the full wave rectified waveform 118 versus the half wave waveform 120. This will affect to a certain extent the response times of the two particular heating coils which are activated by the full wave rectified waveform in comparison to the two coils which are activated by the half wave rectified waveform. This, however, is a function of the particular application of the invention, and it will be appreciated that in certain applications of the invention, the response time of the controlled electrical element on the rotating object may be made independent of whether it is controlled by the half wave waveform or the full wave rectified waveform.

While a preferred embodiment of the invention has been disclosed, it will be appreciated that principles are applicable to other embodiments.

What is claimed is:

1. A control system for providing remote control functions on a moving object from a stationary object comprising:
    transmitting means on the stationary object,
    receiving means on the moving object,
    coupling means coupling said transmitting means and said receiving means,
    said transmitting means including a binary encoding circuit for providing at least four different logic signals, each of which is uniquely correlated with a particular control function to be performed on the moving object, said binary encoding circuit including a one-of-four to BCD encoding circuit, an AC source which supplies a full wave AC waveform, and circuit means receiving said AC waveform and said logic signals to provide a particular electrical waveform pattern in accordance with the logic signal received by said circuit means, said circuit means including a full/half wave generator circuit receiving said full wave AC waveform and being under the control of said binary encoding circuit to provide either a full wave or half wave waveform, an inverter circuit also controlled by said binary encoding circuit, a rectifier bridge between said full/half wave generator circuit and said inverter circuit, said full/half wave generator circuit, said rectifier bridge, and said inverter circuit coating to provide four particular waveform patterns, each of which is correlated with a particular one of said logic signals, said four patterns being, a full wave rectified positive pattern, a half wave rectified positive pattern, a full wave rectified negative pattern, and a half wave rectified negative pattern, and
    said receiving means comprising means for detecting the particular pattern of the waveform which it receives from said transmitting means via said coupling means, and for causing at least a portion of the energy from such receiving waveform to be applied to perform the corresponding control function on the moving object.

2. A control system as set forth in claim 1, including back-to-back zener diodes in said coupling circuit means between said transmitting means and said receiving means.

3. A control system as set forth in claim 1 in which said inverter circuit comprises a plurality of relay contacts cooperatively arranged and coupled with said rectifier bridge, said relay contacts being under the control of relay coils connected with said binary encoding circuit.

4. A control system as set forth in claim 1 in which said AC source supplies said full wave AC waveform as a sinusoidal waveform.

5. A control system as set forth in claim 1 in which said moving object is a rotary object on a shaft which rotates about an axis, and said coupling circuit means includes electrical contact structures disposed at opposite ends of and in axial alignment with said shaft, said receiving means comprising an electrical load between said respective ends of said shaft.

6. A control system for providing remote control functions on a moving object from a stationary object comprising:
    transmitting means on the stationary object,
    receiving means on the moving object,
    coupling means coupling said transmitting means and said receiving means,
    said transmitting means including means for generating selected electrical waveform patterns, each of which is uniquely correlated with a particular control function to be performed on the moving object and consist of unique patterns of electrical waveform half cycles, and for selectively supplying a particular one of said waveforms via said coupling means to said receiving means in accordance with a particular control function which is to be performed on the moving object, and
    said receiving means including a rectifier bridge forming an input of said receiving means to which said coupling means is connected, a full/half wave detector circuit and a polarity detector circuit, said two detector circuits operatively coupled with said rectifier bridge and coacting to provide binary output logic signals, each one of said output logic signals being uniquely correlated with a particular one of said electrical waveform patterns, and decoding logic means receiving said binary output logic signals to provide a corresponding control function in accordance with each of said binary output logic signals, said receiving means causing at least a portion of the energy from the received waveform to be applied to perform the corresponding control function on the moving object.

7. A control system as set forth in claim 6 in which said moving object is a rotary object on a shaft which rotates about an axis, and said coupling circuit means includes electrical contact structures disposed at opposite ends of and in axial alignment with said shaft, said receiving means comprising an electrical load between said respective ends of said shaft.

8. A control system as set forth in claim 6 in which said decoding logic means comprises a BCD to one-of-four decoding circuit having plural outputs.

9. A control system as set forth in claim 8, wherein said receiving means further includes controlled conduction electronic switches each operatively associated with a particular output of said decoding circuit, each of said controlled conduction electronic switches being operatively associated with a particular device on the moving object which performs a particular control function, each controlled conduction electronic switch and its particular device being connected across output terminals of said rectifier bridge.

10. A control system as set forth in claim 9, said coupling circuit means containing means to assist in switching off each controlled conduction electronic switch as the corresponding output of said decoding circuit commands the corresponding controlled conduction electronic switch to switch off.

* * * * *